(12) United States Patent
Clark et al.

(10) Patent No.: US 10,162,435 B2
(45) Date of Patent: Dec. 25, 2018

(54) INPUT DEVICE AND INPUT METHOD USING THE SAME

(71) Applicant: ASUSTeK COMPUTER INC., Taipei (TW)

(72) Inventors: Peter Timothy Clark, Taipei (TW); Chih-Wen Hsieh, Taipei (TW); Yi-Ou Wang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 14/987,726

(22) Filed: Jan. 4, 2016

(65) Prior Publication Data

US 2017/0192537 A1 Jul. 6, 2017

(51) Int. Cl.
G06F 3/0354 (2013.01)
G06F 3/01 (2006.01)
G06F 3/041 (2006.01)

(52) U.S. Cl.
CPC .......... G06F 3/03545 (2013.01); G06F 3/017 (2013.01); G06F 3/0416 (2013.01)

(58) Field of Classification Search
None
See application file for complete search history.

(56) References Cited

U.S. PATENT DOCUMENTS

| 8,963,889 | B2 | 2/2015 | Oda et al. |
| 9,329,703 | B2 | 5/2016 | Falkenburg et al. |
| 9,529,456 | B2 | 12/2016 | Oda et al. |
| 9,606,640 | B2 | 3/2017 | Oda et al. |
| 9,632,599 | B2 | 4/2017 | Oda et al. |
| 2011/0193776 | A1 | 8/2011 | Oda et al. |
| 2012/0331546 | A1 | 12/2012 | Falkenburg et al. |
| 2013/0106718 | A1* | 5/2013 | Sundara-Rajan ... G06F 3/03545 345/173 |
| 2013/0120237 | A1* | 5/2013 | DiVerdi ................... G09G 5/00 345/156 |
| 2014/0253521 | A1* | 9/2014 | Hicks ................... G06F 3/03545 345/179 |
| 2014/0253522 | A1* | 9/2014 | Cueto ................ G06F 3/03545 345/179 |

(Continued)

FOREIGN PATENT DOCUMENTS

| CN | 103677330 | 3/2014 |
| TW | 201229828 | 7/2012 |

(Continued)

*Primary Examiner* — Carl Adams
(74) *Attorney, Agent, or Firm* — JCIPRNET

(57) ABSTRACT

An input device and an input method using the same are provided. The input device is adapted to a computing device and includes a stylus body, a tip sensing module, a gesture sensing module, a processor and a wireless module. The tip sensing module is configured to detect a touch event on a touch screen of the computing device. The gesture sensing module is configured to detect an orientation of the stylus body. The processor is coupled to the tip sensing module and the gesture sensing module, and is configured to generate a command when the touch event on the touch screen and the orientation are detected. The wireless module is coupled to the processor and is configured to transmit the command to the computing device to trigger a function on the computing device.

11 Claims, 5 Drawing Sheets

(56) References Cited

U.S. PATENT DOCUMENTS

| | | |
|---|---|---|
| 2015/0070315 A1 | 3/2015 | Oda et al. |
| 2015/0070316 A1 | 3/2015 | Oda et al. |
| 2015/0070317 A1 | 3/2015 | Oda et al. |
| 2015/0220168 A1 | 8/2015 | Keating et al. |
| 2015/0220169 A1* | 8/2015 | Keating .............. G06F 3/03545 345/179 |
| 2016/0162054 A1 | 6/2016 | Oda et al. |
| 2016/0357343 A1 | 12/2016 | Falkenburg et al. |

FOREIGN PATENT DOCUMENTS

| | | |
|---|---|---|
| TW | 201305859 | 2/2013 |
| TW | 201543276 | 11/2015 |

\* cited by examiner

INPUT DEVICE AND INPUT METHOD USING THE SAME

BACKGROUND OF THE INVENTION

Field of the Invention

The invention relates to an input device, more particularly, to an input device for a computing device.

Description of the Related Art

Handwriting is an area of occupational performance that is very important from children to adult. How to grasp a pen/pencil correctly is thus a critical issue because it can lead to finger fatigue, if not grasp correctly, which will further impact on the speed and legibility of writing or drawing. Furthermore, a stylus, which is to simulate pen, pencil, brush, etc., normally used for note taking or picture drawing in computing environment.

Many academic researches and clinic reports indicate and support the theory that so-called "dynamic tripod (DT) grasp" has been promoted as the optimal grasp pattern because it allows for the fine dexterous movements of the fingers to create letters. Therapists and teachers commonly recommend that children, especially those with handwriting difficulties, use the DT pencil grasp. In the DT grasp, the pencil is held with the tip of the thumb and the index finger and laid on the side of the third finger. The thumb and the index finger form a circle. A desirable feature of the DT pencil grasp is the facilitation of fluid and fine movements of the three fingers as they flex and extend to form vertical and curved letter strokes. In addition, the ring and the fifth fingers provide stabilization against the palm and support the metacarpal arch of the hand.

Based on aforesaid grasp theory, applying tripod grasp design to a stylus is also important for stylus heavy users.

BRIEF SUMMARY OF THE INVENTION

According to a first aspect of the present disclosure, an input device, comprises: a stylus body; a tip sensing module disposing at the stylus body and configuring to detect a touch event on a touch screen of the computing device; a gesture sensing module disposing at the stylus body and configuring to detect an orientation of the stylus body; a processor coupling to the tip sensing module and the gesture sensing module, configuring to generate a command when the touch event on the touch screen and the orientation are detected; and a wireless module disposing in the stylus body and coupling to the processor, and configuring to transmit the command to the computing device to trigger a function on the computing device.

Furthermore, according to a second aspect of the present disclosure, an input method using an input device is also provided. The input method comprises: detecting a touch event on a touch screen of the computing device and an orientation of a stylus body of the input device; generating a command when the touch event on the touch screen and the orientation are detected; and transmitting the command to the computing device to trigger a function on the computing device.

In order to make the aforementioned and other features and advantages of the invention more comprehensible, several examples accompanied with figures are described in detail below.

BRIEF DESCRIPTION OF THE DRAWINGS

The accompanying drawings are included to provide a further understanding of the invention, and are incorporated in and constitute a part of this specification. The drawings illustrate examples of the invention and, together with the description, serve to explain the principles of the invention.

DETAILED DESCRIPTION OF THE EMBODIMENTS

Figure 1:
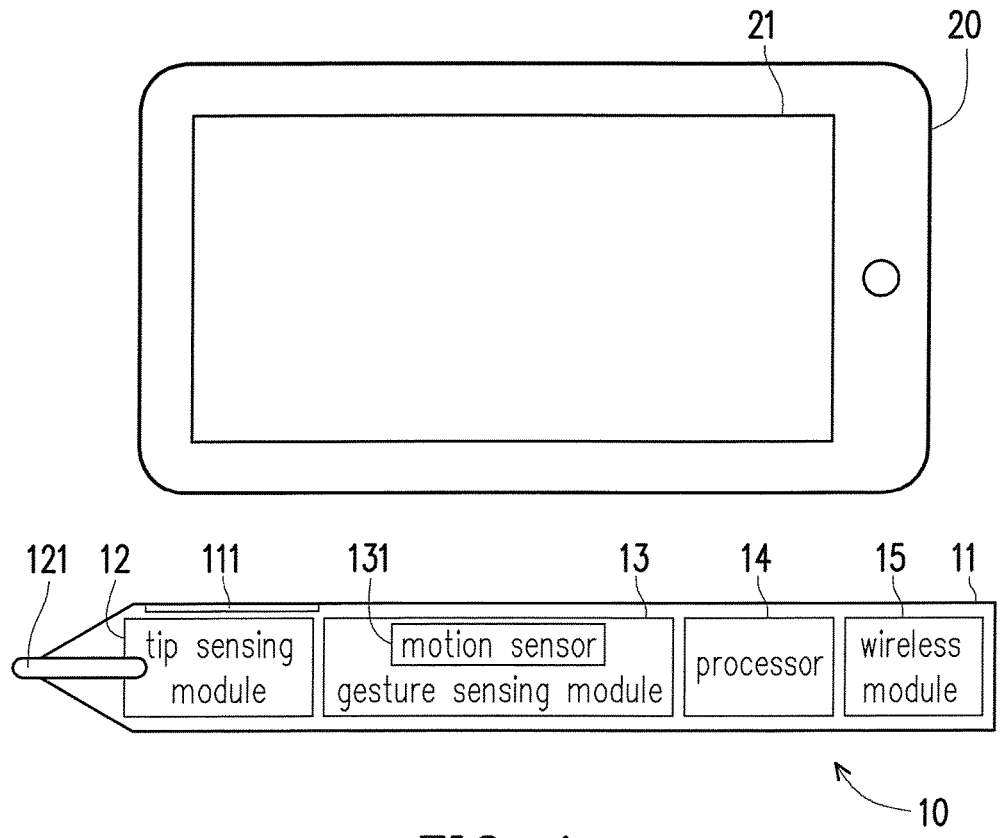
FIG. 1 is a schematic diagram of an input device in an embodiment.

FIG. 1 is a schematic diagram of an input device in an embodiment. Referring to FIG. 1, the input device 10 of the present embodiment is, for example, a stylus, a digital pen, a pointing device and the like, allowing users to write directly onto a touch screen 21 of a computing device 20 such as a smartphone, a tablet computer, a laptop or any other portable or stationary devices. The input device 10 includes a stylus body 11, a tip sensing module 12, a gesture sensing module 13, a processor 14, and a wireless module 15. Specifically, the input device 10 further includes a battery (not shown) for supplying power to the tip sensing module 12, physical buttons (not shown) for triggering power on/off, color change, or volume adjustment, or indicators (not shown) for indicating a current status of the input device 10, which is not limited herein.

The shape of the stylus body 11 is a round shape, a regular triangle shape, a Reuleaux triangle shape, or a hexagon shape for user's grasp. In an embodiment, the stylus body 11 further comprises a touch sensitive unit 111 for detecting touch of fingers grasping the stylus body 11, in which the touch sensitive unit 111 may have a cylinder touch sensing area encircling a longitudinal axis of the stylus body 11 or have at least three touch sensing areas encircling the longitudinal axis of the stylus body 11. In another embodiment, the stylus body 11 further comprises at least three holding areas encircling a longitudinal axis of the stylus body 11 for the user to hold the stylus body 11 with fingers.

The tip sensing module 12 is disposed in the stylus body 11 and includes a tip sensor 121 integrated with a microcontroller unit (MCU) (not shown), in which the tip sensor 121 is, for example, a pressure sensor, a proximity sensor, a magnetic sensor, or a combination thereof In an embodiment, the tip sensing module 12 is disposed at one end (i.e. a tip) of the stylus body 11 for detecting a touch event with a touch screen of aforesaid computing device.

The gesture sensing module 13 is disposed in the stylus body 11 and includes at least one motion sensor 131 integrated with a MCU (not shown) for sensing an orientation of the stylus body 11, in which the motion sensor 131 is an accelerometer (i.e. G-sensor), a gyro sensor, or a digital compass, or a combination thereof The orientation of the stylus body 11 is, for example, an angular position of the stylus body 11 representing how the stylus body 11 is placed in a three-dimensional space and may further comprise a rotation direction and a rotation angle of the stylus body 11 about a longitudinal axis of the stylus body 11, which is not limited herein.

The processor 14 is coupled to the tip sensing module 12 and the gesture sensing module 13, respectively. The processor 14 is a central processing unit (CPU), a programmable microprocessor for common use or specific use, a digital signal processor (DSP), a programmable controller and an application specific integrated circuit (ASIC) or a combination of, which is not limited herein.

The wireless module 15 is disposed in the stylus body 11 and coupled to the processor 14, and supports wireless protocols such as Bluetooth, Wi-Fi, Wi-Fi Direct, near-field communication (NFC), or device-to-device (D2D) communication, for transmitting data to the computing device.

Figure 2:
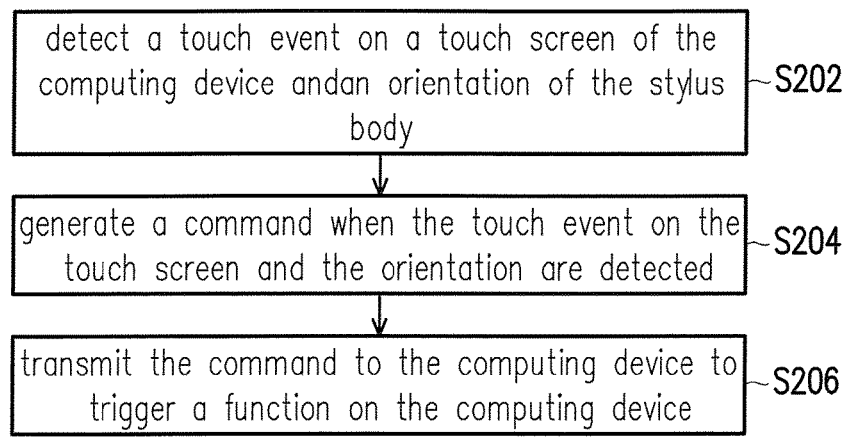
FIG. 2 is a flowchart illustrating an input method in an embodiment.

FIG. 2 is a flowchart illustrating an input method in an embodiment. Referring to FIG. 1 and FIG. 2 together, the method of the present embodiment is adapted for aforesaid input device 10 and the computing device 20. Detailed steps of the method are described as below, with reference to each element of the input device 10 and the computing device 20 depicted in FIG. 1.

Step S202 is to detect a touch event on the touch screen 21 of the computing device 20 and an orientation of the stylus body 11. In one embodiment, the tip sensing module 12 of the input device 10 detects the touch event on the touch screen 21 of the computing device 20 by using the tip sensor 121, in which the touch event includes data associated with a touch behavior or a hover behavior between the tip sensor 121 and the touch screen, such as induced capacitance, magnetic field, pressure, location on the touch screen or even distance from the touch screen. In one embodiment, the gesture sensing module 13 of the input device 10 senses an orientation of the stylus body 11 by using the motion sensor 131. In detail, the motion sensor 131 detects acceleration of the stylus body 11 and the gesture sensing module 13 integrates the detected acceleration data to estimate the orientation of the stylus body 11 in a three-dimensional space. Such an orientation reveals the posture of the user grasping the stylus body 11.

Step S204 is to generate a command when the touch event on the touch screen 21 and the orientation are detected. In one embodiment, the processor 14 determines a function to be executed on the detected touch event corresponding to the detected orientation and generates a command corresponding to the determined function. The function to be determined herein is the function to be executed by the computing device 20, such as a color adjustment function or writing, painting tool changing functions, in which the tool changing function is to change as a pen, change as a highlighter, or change as an eraser.

Step S206 is to transmit the command to a computing device 20 to trigger a function on the computing device 20. In one embodiment, the wireless module 15 of the input device 10 transmits the command generated by the processor 14 to the computing device 20. As a result, the computing device 20 executes a function corresponding to the received command to the touch event generated between the touch screen 21 and the tip sensor 142 of the input device 10. In an embodiment, the computing device 20 is applied with a red color and/or a brush effect to a line drawn on the touch screen 21 by the input device 10, but the disclosure is not limited thereto.

It is noted that, in one embodiment, a touch sensitive unit (not shown) is further disposed on the stylus body 11, and configured to detect touch of the fingers grasping the stylus body 11. Accordingly, when the user grasps the input device 10 in a correct position, the touch sensitive unit detects the continuously touch of fingers, and the wireless module 15 transmits the command to the computing device 20 only when the touch sensitive unit continuously detects the touch of fingers grasping the stylus body 11. Accordingly, the intent of the user to trigger the function can be ensured and a false action triggered by accidental operation can be avoided.

Through aforesaid method, the user may trigger a function to be applied to the touch event generated by the input device through grasping the input device to place the input device in a specific orientation corresponding to the function. Accordingly, intuitive control for the input device is achieved.

Figure 3:
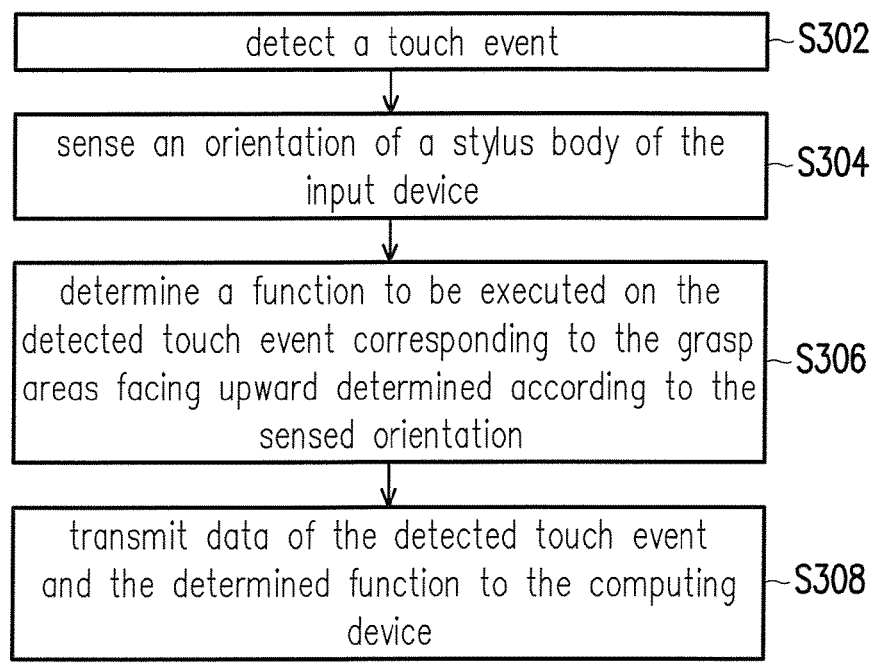
FIG. 3 is a flowchart illustrating an input method in an embodiment.

FIG. 3 is a flowchart illustrating an input method in an embodiment. Referring to FIG. 1 and FIG. 3 together, the method of the present embodiment is adapted for aforesaid input device 10 and the computing device 20. Detailed steps of the method are described as below, with reference to each element of the input device 10 and the computing device 20 depicted in FIG. 1.

Step S302 is to detect a touch event on the touch screen 21 of the computing device 20. In one embodiment, the tip sensing module 14 of the input device 10 detects a touch event on the touch screen of the computing device by using the tip sensor 142 In an embodiment, the touch event includes data associated with a touch behavior or a hover behavior between the tip sensor 142 and the touch screen, such as induced capacitance, magnetic field, pressure, location on the touch screen or even distance from the touch screen.

Step S304 is to sense an orientation of the stylus body 11. In one embodiment, the gesture sensing module 13 of the input device 10 senses an orientation of the stylus body 11 by using the motion sensor 131. In detail, the motion sensor 131 detects acceleration of the stylus body 11 and the gesture sensing module 13 integrates the detected acceleration data to estimate the orientation of the stylus body 11 in a three-dimensional space. Such an orientation reveals the posture of the user grasping the stylus body 11.

It is noted that, in accordance with the finger configuration of aforesaid "dynamic tripod grasp" that three fingers are respectively placed on three areas of a surface of the pencil, in the present embodiment, holding areas encircling a longitudinal axis of the stylus body 11 are defined on a surface of the stylus body 11 facilitating the grasp of fingers under a natural posture of the user holding the stylus body 11. In an embodiment, three holding areas facilitating the grasp of the thumb, the index finger and the middle finger are defined. The holding areas facing upward as described hereinafter are regarded as being grasped by the thumb and the index finger of the user and are further implemented as a reference to distinguish the functions the user intends to apply.

Step 306 is to determine a function to be executed on the detected touch event corresponding to the holding areas facing upward that are determined according to the sensed orientation. In one embodiment, the processor 14 determines a function to be executed on the detected touch event corresponding to the holding areas facing upward that are determined according to the sensed orientation. The function to be determined herein is the function to be executed by the computing device, such as a color adjustment function or writing, painting tool functions, in which the tool function may be a pen, a highlighter, or an eraser.

In detail, based on the sensed orientation, it is known which portion of the input device 10 is facing upward. In an embodiment, when the stylus body 11 is a Reuleaux triangle shape, two of the three surfaces of the stylus body 11 face upward when the stylus body 11 is grasped by the user, and therefore the processor 14 may determine the two holding areas facing upward that are grasped by the thumb and the index finger according to the sensed orientation and further determine the function that corresponds to these two holding areas as the function the user intends to apply.

Figure 4:
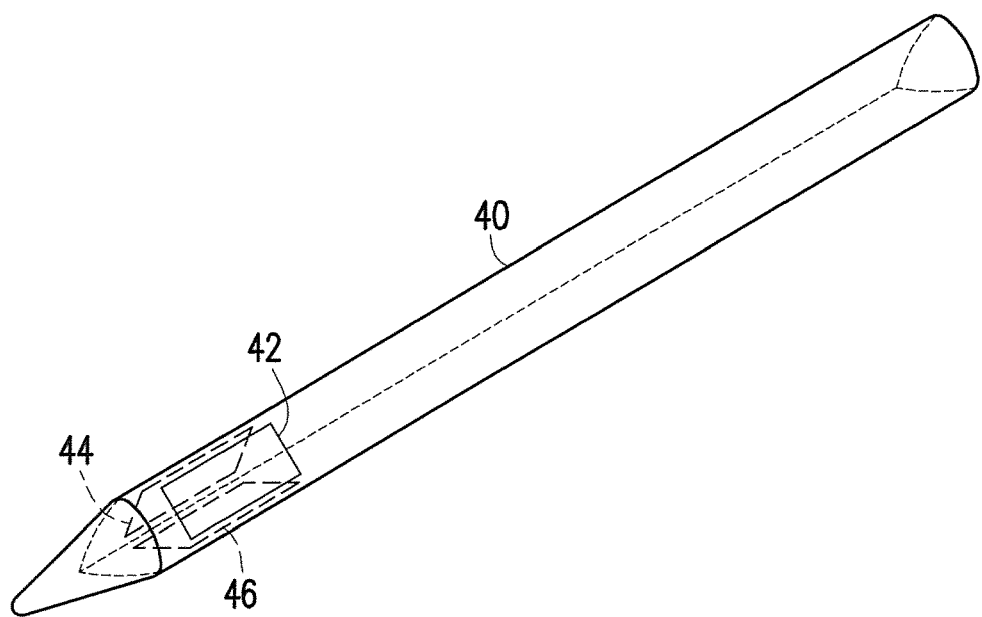
FIG. 4 is a schematic diagram of an input device in an embodiment.

FIG. 4 is a schematic diagram of an input device in an embodiment. Referring to FIG. 4, the input device 40 of the present embodiment has a Reuleaux triangle shape, and three holding areas 42, 44 and 46 are respectively defined on three surfaces of the input device 40. The holding areas 42 and 44 are determined facing upward when the input device 40 is grasped by the thumb and the index finger of a user. In another embodiment, the input device 40 further comprises a touch sensitive unit consisting of three touch sensing areas which are respectively disposed on aforesaid holding areas 42, 44 and 46 for detecting touch of fingers grasping the input device 40. Accordingly, when the user grasps the input device 40 in a correct position, the touch sensitive unit continuously detects touch of fingers so as to ensure the intent of the user to trigger the function as described in aforesaid embodiment and accordingly a false action triggered by accidental operation can be avoided.

Step 308 is to transmit data of the detected touch event and the determined function to the computing device 20. In one embodiment, the wireless module 15 of the input device 10 transmits data of the touch event detected by the tip sensing module 14 and the function determined by the processor 14 to the computing device 20 having the touch screen 21. As a result, the computing device 20 may apply the function to the touch event generated between the touch screen 21 and the tip sensor 142 of the input device 10. In an embodiment, the computing device 20 is applied with a red color and/or a brush effect to a line drawn on the touch screen 21 by the input device 10, but the disclosure is not limited thereto.

Through aforesaid method, the user may trigger a function to be applied to the touch event generated by the input device through grasping the input device with the holding areas that correspond to the function being facing upward. Accordingly, intuitive control for the input device is achieved.

It is noted that the present invention also provide an intuitive method for switching the function being triggered by simply performing a rolling gesture on the input device and the function corresponds to the holding areas facing upward after rolling may be switched to without miscellaneous operations.

In detail, referring to FIG. 1 and FIG. 3, after the step S308, the gesture sensing module 13 of input device 10 may further sense a rotational movement of the stylus body 11 about the longitudinal axis and then the processor 14 switches the function according to a rotation direction and a rotation angle of the rotational movement. The rotation direction comprises clockwise or counterclockwise, and the rotation angle comprises 120, 240 or 360 degrees, but the disclosure is not limited thereto.

Figure 5A:
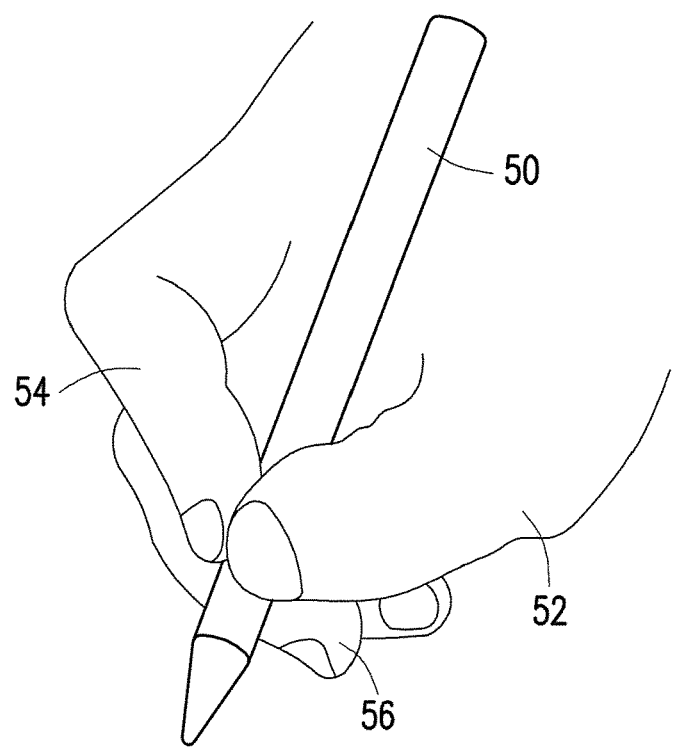
FIG. 5A is a schematic diagram of grasping an input device in an embodiment.
Figure 5B:
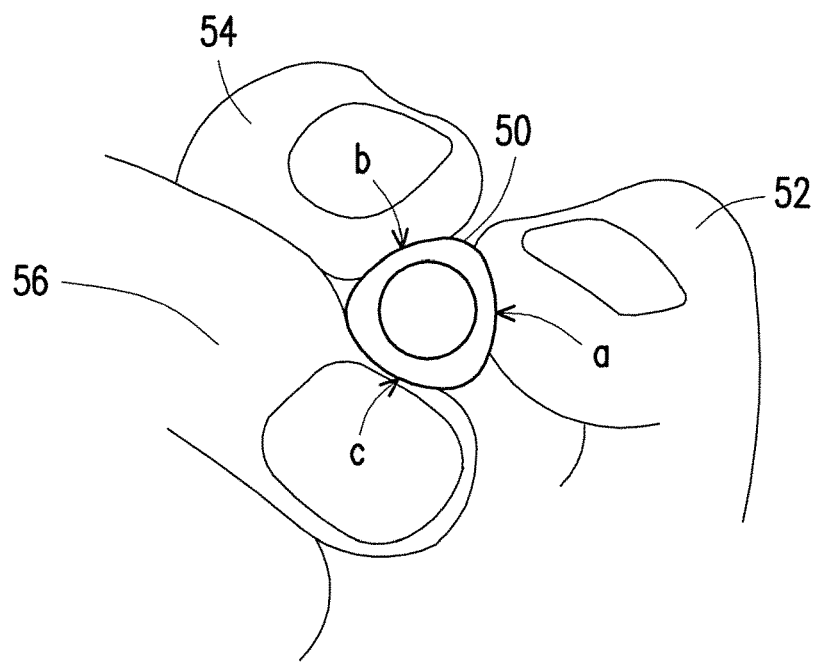
FIG. 5B is a cross-sectional view of the input device being grasped in FIG. 4A in an embodiment.

FIG. 5A is a schematic diagram of grasping an input device in an embodiment, and FIG. 5B is a cross-sectional view of the input device being grasped in FIG. 5A in an embodiment. Referring to FIG. 5A, the input device 50 of the present embodiment has a Reuleaux triangle shape and is grasped by a thumb 52, an index finger 54 and a middle finger 56 of a user. Referring to FIG. 5B, in the present embodiment, the user grasps the input device 50 by grasping the holding areas a, b, c with the thumb 52, the index finger 54 and the middle finger 56, respectively. At this time, since the holding areas a and b being gasped by the thumb 52 and the index finger 54 are facing upward, a pen function is triggered according to the orientation of the input device 50 shown in FIG. 5A.

Further, if the user performs a rolling gesture on the input device 50 to rotate clockwise by 120 degrees, the holding areas being grasped by the thumb 52 and index finger 54 are changed to holding areas a and c, and therefore the input device 50 may switch the function to be an eraser function.

Moreover, if the user again performs a rolling gesture on the input device 50 to rotate clockwise by 120 degrees, the holding areas being grasped by the thumb 52 and index finger 54 are changed to holding areas b and c, and therefore the input device 50 may switch the function to be a highlighter function.

It is noted that, to notify the user of the function to be triggered by his/her current grasp gesture, at least one indicator may be further disposed on the stylus body, especially disposed on the edges or middle areas between the holding areas, so as to distinguish the holding areas and indicate the function corresponding to each pair of the holding areas.

Figure 6:
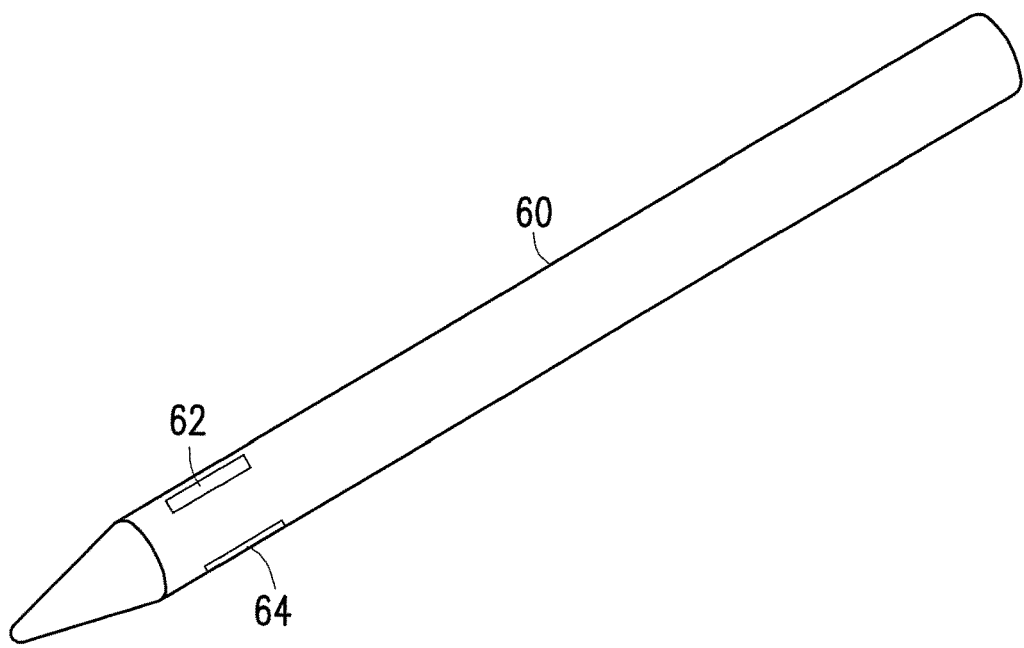
FIG. 6 is a schematic diagram of input device in an embodiment.
Figure 7:
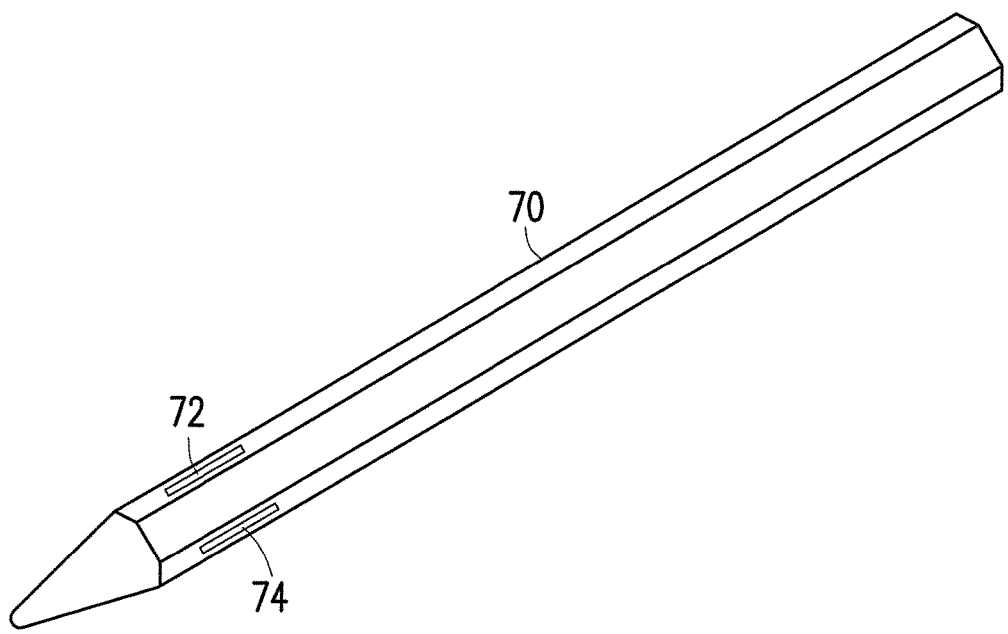
FIG. 7 is a schematic diagram of input device in an embodiment.
Figure 8:
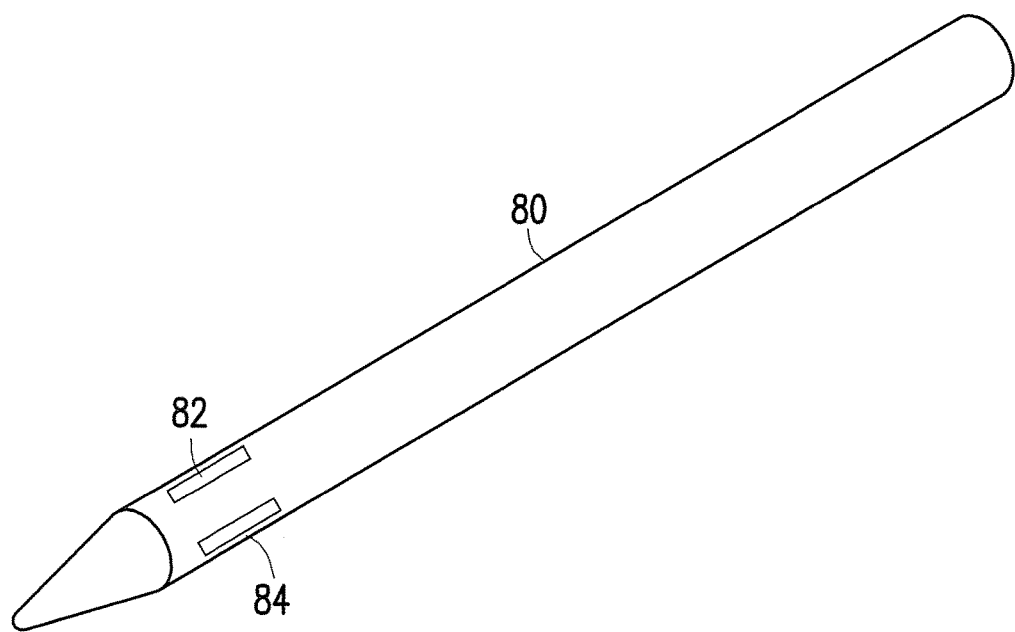
FIG. 8 is a schematic diagram of input device in an embodiment.

FIG. 6, FIG. 7 and FIG. 8 are schematic diagrams of input device in an embodiment. Referring to FIG. 6, the input device 60 of the present embodiment has a Reuleaux triangle shape, and the holding areas are defined on three surfaces of the input device 60 forming the Reuleaux triangle. Three indicators (e.g. indicators 62 and 64) are respectively disposed between the holding areas, and the indicator 62 disposed between the holding areas facing upward is used to indicate the function to be triggered upon the current orientation of the input device 60.

Referring to FIG. 7, the input device 70 of the present embodiment has a hexagon shape, and the holding areas are separately defined on three of the six surfaces of the input device 70 forming the hexagon. Three indicators (e.g. indicators 72 and 74) are respectively disposed on the middle areas between the holding areas, and the indicator 72 disposed on the middle area between the holding areas facing upward is used to indicate the function to be triggered upon the current orientation of the input device 70.

Referring to FIG. 8, the input device 80 of the present embodiment has a round shape, and the holding areas are equally defined on a periphery surface of the input device 80. Three indicators (e.g. indicators 82 and 84) are respectively disposed between the holding areas, and the indicator 82 disposed between the holding areas facing upward is used to indicate the function to be triggered upon the current orientation of the input device 80.

It is noted that, in one embodiment, only one indicator capable of indicating at least three colors may be disposed on the stylus body to indicate the function corresponding to each pair of the holding areas with the colors, so as to distinguish the holding areas and/or the functions.

To sum up, in the input device and the input method using the same provided by the present application, holding areas adapted for grasping the input device are defined and functions to be executed on the touch event detected by the input device are set to correspond different phases of the orientation of the input device. When the input device is activated, the orientation of the input device is sensed to determine the holding areas facing upward and accordingly determine the function the user intends to apply. Accordingly, intuitive control for the input device is achieved.

Although the invention has been described with reference to the above examples, it will be apparent to one of the ordinary skill in the art that modifications to the described example may be made without departing from the spirit of the invention. Accordingly, the scope of the invention will be defined by the attached claims not by the above detailed descriptions.

What is claimed is:

1. An input device, adapted to a computing device, comprising:
a stylus body comprising at least three holding areas encircling a longitudinal axis of the stylus body;
a tip sensing module disposing at the stylus body and configuring to detect a touch event on a touch screen of the computing device;
a gesture sensing module disposing at the stylus body and configuring to detect an orientation of the stylus body;
three indicators, disposing on the stylus body, wherein each indicator is disposed on an edge or a middle area between two of the holding areas;
a processor, coupling to the tip sensing module and the gesture sensing module, configuring to determine two of the holding areas which are facing upward according to the orientation and generate a command according to the two of the holding areas which are facing upward when the touch event on the touch screen and the orientation are detected; and
a wireless module, disposing in the stylus body and coupling to the processor, and configuring to transmit the command to the computing device to switch to one of a plurality of functions on the computing device,
wherein each of the plurality of functions corresponds to two of the holding areas, respectively,
wherein the one function is switched to when a rotation about the longitudinal axis of the stylus body is detected by the gesture sensing module, and the one switched function corresponds to the two holding areas which are facing upward, and
wherein the indicator disposed between the two holding areas which are facing upward indicates the function corresponding to the two holding areas which are facing upward.

2. The input device according to claim 1, wherein the orientation detected by the gesture sensing module further comprises a rotation direction and a rotation angle of the stylus body about the longitudinal axis.

3. The input device according to claim 1, wherein a shape of the stylus body is Reuleaux triangle shape, round shape, or hexagon shape.

4. The input device according to claim 1, wherein the stylus body further comprises a touch sensitive unit encircling the longitudinal axis of the stylus body and the wireless module transmits the command to the computing device only when the touch sensitive unit continuously detects a touch of fingers grasping the stylus body.

5. The input device according to claim 1, wherein the plurality of functions on the computing device comprises a color adjustment function or a tool changing function, and the tool changing function comprises changing as a pen, changing as a highlighter, or changing as an eraser.

6. The input device according to claim 1, wherein the gesture sensing module senses the orientation of the stylus body by using at least one motion sensor and the at least one motion sensor comprises one or a plurality of an accelerometer, a gyro sensor, or a digital compass.

7. An input method for an input device, applied to a computing device, the method comprising:
detecting a touch event on a touch screen of the computing device and an orientation of a stylus body of the input device, wherein the stylus body comprises at least three holding areas encircling a longitudinal axis of the stylus body, wherein three indicators are disposed on the stylus body, wherein each indicator is disposed on an edge or a middle area between two of the holding areas;
determining two of the holding areas which are facing upward according to the orientation;
generating a command according to the two of the holding areas which are facing upward when the touch event on the touch screen and the orientation are detected;
transmitting the command to the computing device to switch to one of a plurality of functions on the computing device, wherein each of the plurality of functions corresponds to two of the holding areas, respectively, wherein the one function is switched to when a rotation about the longitudinal axis of the stylus body is detected, and the one switched function corresponds to the two holding areas which are facing upward; and
indicating the function corresponding to the two holding areas which are facing upward by using the indicator disposed between the two holding areas which are facing upward.

8. The input method according to claim 7, wherein the orientation further comprises a rotation direction and a rotation angle of the stylus body about the longitudinal axis of the stylus body.

9. The input method according to claim 7, wherein a shape of the stylus body is Reuleaux triangle shape, round shape, or hexagon shape.

10. The input method according to claim 7, the step of transmitting the command to the computing device to switch to one of the plurality of functions on the computing device comprising:
transmitting the command to the computing device only when a touch of fingers grasping the input device is detected continuously by a touch sensitive unit encircling the longitudinal axis of the stylus body.

11. The input method according to claim 7, wherein the plurality of functions on the computing device comprises a color adjustment function or a tool changing function, and the tool changing function comprises changing as a pen, changing as a highlighter, or changing as an eraser.

* * * * *